(12) United States Patent
Dutilleul

(10) Patent No.: US 7,997,120 B2
(45) Date of Patent: Aug. 16, 2011

(54) METHOD FOR PRESSURE TESTING A THREADED COMPONENT

(75) Inventor: Pierre Dutilleul, Jenlain (FR)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 670 days.

(21) Appl. No.: 12/066,201

(22) PCT Filed: Sep. 6, 2006

(86) PCT No.: PCT/EP2006/008675
§ 371 (c)(1),
(2), (4) Date: Apr. 29, 2008

(87) PCT Pub. No.: WO2007/031221
PCT Pub. Date: Mar. 22, 2007

(65) Prior Publication Data
US 2008/0223113 A1  Sep. 18, 2008

(30) Foreign Application Priority Data
Sep. 12, 2005  (FR) ..................... 05 09268

(51) Int. Cl.
*G01M 3/04*  (2006.01)
(52) U.S. Cl. ........................................ 73/49.8
(58) Field of Classification Search ..................... 73/49.8
See application file for complete search history.

(56) References Cited

U.S. PATENT DOCUMENTS

| 3,448,773 A | | 6/1969 | Bindernagel et al. |
| 4,407,171 A | * | 10/1983 | Hasha et al. .................. 73/49.1 |
| 4,643,467 A | | 2/1987 | Wood et al. |
| 5,505,502 A | * | 4/1996 | Smith et al. .................. 285/334 |
| 6,349,979 B1 | * | 2/2002 | Noel et al. .................... 285/333 |
| 7,484,776 B2 | * | 2/2009 | Dallas et al. .................. 285/356 |
| 2002/0163192 A1 | * | 11/2002 | Coulon et al. ................. 285/331 |

FOREIGN PATENT DOCUMENTS

EP  0 386 373  9/1990

* cited by examiner

*Primary Examiner* — Hezron Williams
*Assistant Examiner* — Alex Devito
(74) *Attorney, Agent, or Firm* — Oblon, Spivak, McClelland, Maier & Neustadt, L.L.P.

(57) ABSTRACT

A method for pressure testing a threaded component is provided. A cap includes a female threading that is matched with a threading of a first male threaded element. The cap is made up onto the first male threaded element of a component to be tested so as to compress a sealing ring between metal surfaces of the first element and the cap, and a test pressure is established inside the component. The male element has an annular lip which is capable of deforming radially outwardly under the effect of the test pressure. Between a radially outward surface of the lip and a facing surface of the cap, at the end of makeup there exists a clearance having a value which has been selected sufficiently small so that, under the effect of the test pressure, the lip bears on said facing surface without undergoing plastic deformation.

18 Claims, 4 Drawing Sheets

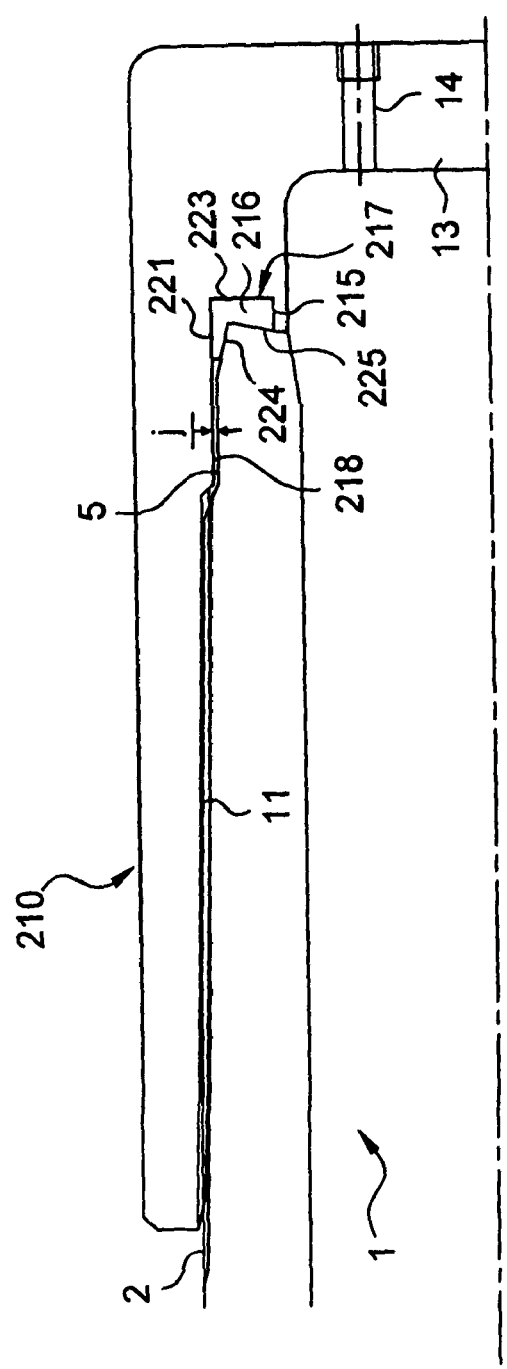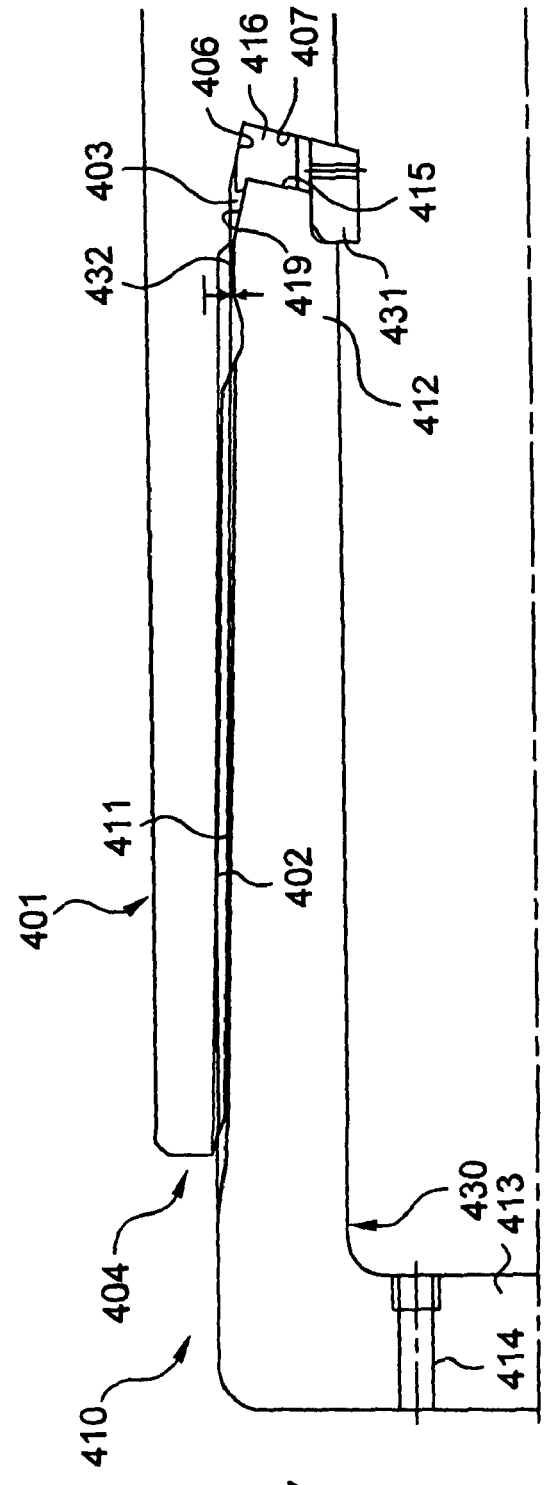

METHOD FOR PRESSURE TESTING A THREADED COMPONENT

The invention relates to a method for pressure testing a first component provided with a first threaded tubular element comprising a first threading and a sealing surface which, in service, is capable of cooperating respectively with a matching threading and a matching sealing surface of another tubular threaded element for connection by makeup of two threaded elements with a metal-on-metal seal between said sealing surfaces.

The component which, depending on requirements, is to undergo a test as regards its seal against water or gas under internal pressure may, for example, be an accessory (safety valve, string suspension device, string section adapter) or a tubular sub-assembly intended for insertion into a tubular string of a hydrocarbon well by makeup.

The method is not intended to test the sealing connecting means of the first component and another component, but rather the first component itself, separately from the first threaded element the sealing connecting means of which are discussed elsewhere.

A method is known in which a second component in the form of a cap or a plug (cap/plug) comprising a threading matching the first threading is made up onto the first threaded element to axially compress an annular sealing ring between the facing metal surfaces of the first threaded element and the cap/plug, and a test pressure is established inside said components, that of said components which has a male threading having, between the latter and its free end, an annular lip which is capable of deforming radially outwardly under the effect of said test pressure.

In another known method in which the sealing surface of the first component is used to establish a seal by interfering metal-on-metal contact with the cap/plug, said sealing surface risks being deteriorated during the test, and the component to be tested cannot be considered to be new when it is delivered to the consumer. Such an interfering contact also requires power tongs for makeup.

In the case of a method employing an annular sealing ring, the annular lip is not supported radially and risks permanent deformation due to the test pressure, rendering the component concerned unsuitable for use because of the risk that the component to be tested will leak in operation or the cap/plug will not be re-usable.

The invention aims to overcome these disadvantages.

In particular, the invention provides a method of the type described above employing an annular sealing ring, and provides that between the radially outward surface of the lip and the facing surface of the other component, at the end of makeup there exists a clearance having, over at least part of the length of the lip, a value which is selected so as to be sufficiently small so that, under the effect of the test pressure, the lip bears on said facing surface practically without undergoing plastic deformation.

The term "practically without undergoing plastic deformation" means ignoring a slight plastic deformation which could be detected by sensitive measuring means but which would have no effect on the operational characteristics of the component concerned.

Optional characteristics of the invention, which may be complementary thereto or substitutional, are defined below:
said value is at least 0.05 mm in diametrical clearance;
the nominal diameter of said threadings is over 200 mm and said value is at least 0.1 mm in diametrical clearance;
said value represents a diametrical clearance of at most 0.3% of the nominal diameter of said threadings;
said radially outward surface comprises a generally tapered portion, said clearance having said value at said generally tapered portion and a higher value at the remainder of said radially outward surface;
said generally tapered portion is adjacent to the free end of the lip;
said generally tapered portion is distant from the free end of the lip and separated therefrom by a portion which is less inclined to the axis than said generally tapered portion;
said radially outward surface comprises a generally tapered portion and at least one portion which is less inclined to the axis than said generally tapered portion, said clearance having said value at least said less inclined portion and a higher value at the remainder of said radially outward surface;
said component which has the male threading is the first component and said tapered portion constitutes said sealing surface;
said component which has the male threading is the first component and said clearance has said value between a cylindrical portion of said radially outward surface and a cylindrical boss formed on said facing surface;
said sealing ring is partially housed in an annular groove of the cap/plug;
the free end of the lip has a convex V shaped profile which engages with a concave V shaped profile of said sealing ring,
said sealing surface of said first threaded element is tapered and defines one of the branches of said convex V shaped profile;
the cap/plug has an axial abutment surface which can abut with a corresponding surface of the first component to limit compression of the sealing ring;
the cap/plug comprises a cap/plug body on which is mounted an insert which is removable and/or axially adjustable, having said axial abutment surface;
said threadings of the first and second components are non interfering to allow makeup using manual equipment.

The term "generally tapered" as used here means a surface having a generally tapered shape but the generatrix of which is not necessarily rectilinear and which may in particular be domed over at least part of its length.

The invention also provides a cap/plug for carrying out the method defined above.

A female cap in accordance with the invention comprises a metal body formed by a cap base and a peripheral wall as well as an annular sealing ring, said peripheral wall having a female threading capable of cooperating with the male threading of a first tubular threading element of a first component to be tested under pressure and defining axially between said threading and said base a housing capable of receiving a male lip of said first threaded element, the radially inwardly turned surface of said housing having at least one tapered and/or cylindrical portion.

A male plug of the invention comprises a metal body formed by a plug base and a peripheral wall as well as an annular sealing ring, said peripheral wall having a male threading which is capable of cooperating with the female threading of a first tubular threaded element of a first component to be tested under pressure and, extending axially between said threading and said base, a male lip which can be received in a housing in said first threaded element, the radially outwardly turned surface of said lip having at least one tapered and/or cylindrical portion.

The characteristics and advantages of the invention will be explained in more detail in the following description made with reference to the accompanying drawings.

FIGS. 4 and 5 are views analogous to FIG. 2, relating to other implementations of the method.

FIG. 7 is a view analogous to FIG. 2, showing a female threaded element of a component to be tested and a male plug.

Figure 1:
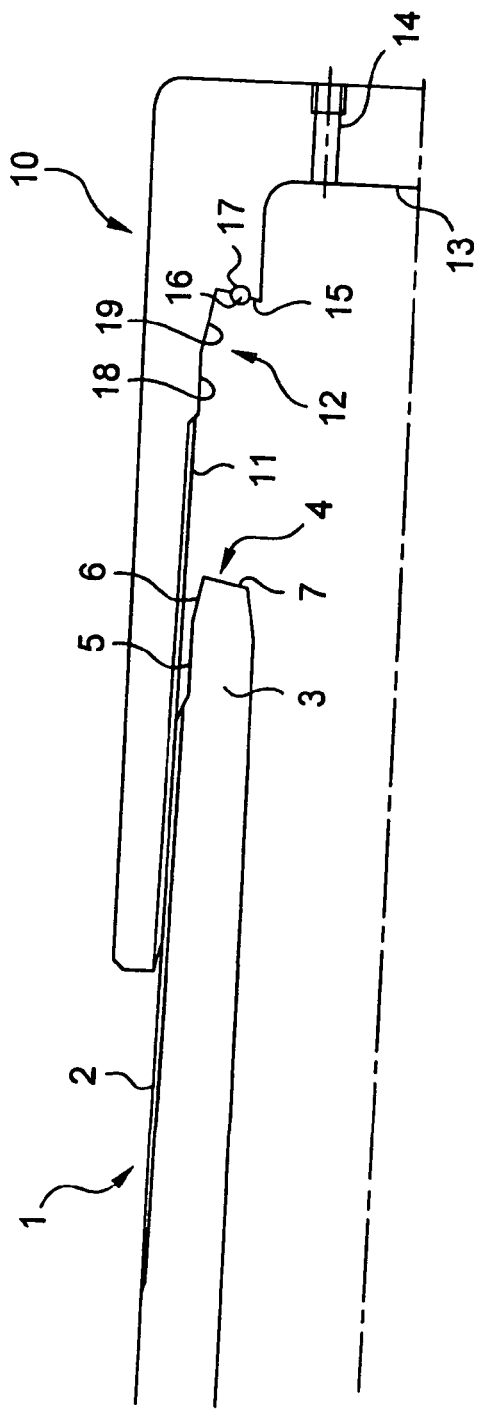
FIGS. 1 to 3 are axial half sections showing a male threaded tubular element belonging to a component to be tested under pressure and a female cap making up into said male element to carry out the method of the invention, respectively during makeup, at the end of makeup and during the pressure test.

FIG. 1 represents a male threaded tubular end or threaded element 1 of a tubular or hollow component which is to undergo a pressure test, which is not further represented here, its structure and function not being relevant to the invention. This male end is provided with a male tapered threading 2 and a non threaded portion 3 disposed beyond the threading towards the free end 4 of the threaded element 1 and termed a lip. The threading 2 is intended to be assembled subsequently with another tubular component in a tubular string for a hydrocarbon well.

The radially outward surface of the lip comprises, moving from the threading towards the free end, a cylindrical portion 5 followed by a tapered sealing surface 6 which is adjacent to a concave tapered end surface 7 with a peak half angle of close to 90° forming an abutment surface.

The sealing surface 6 and the abutment surface 7 are intended to cooperate in operation in a well with complementary surfaces on the other tubular component mentioned above to produce a metal/metal seal between the two tubular components.

FIG. 1 also shows a threaded female cap 10 to be tested intended to isolate the inner space of the component which is to be pressure tested. Said cap is formed by a peripheral wall provided with a tapered female threading 11 and defining a housing 12 for the lip 3, and a base wall 13 traversed by a pressurized fluid supply 14. The threading 11 matches the threading 2 and is preferably designed to allow manual makeup of the cap onto the element 1, for example using a key chain providing a makeup torque of about 1000 N m.

The housing 12 ends in a shoulder 15 which is substantially of the same taper as the abutment surface 7, which will face the latter during makeup, as can be seen in the figure. A toroidal annular sealing ring 16 formed from deformable synthetic material is disposed in a groove 17 provided in the shoulder 15 and projecting therefrom.

The peripheral surface of the housing 12 comprises a cylindrical portion 18 and a tapered portion 19 corresponding respectively to the surface portions 5 and 6 of the lip 3.

Figure 2:
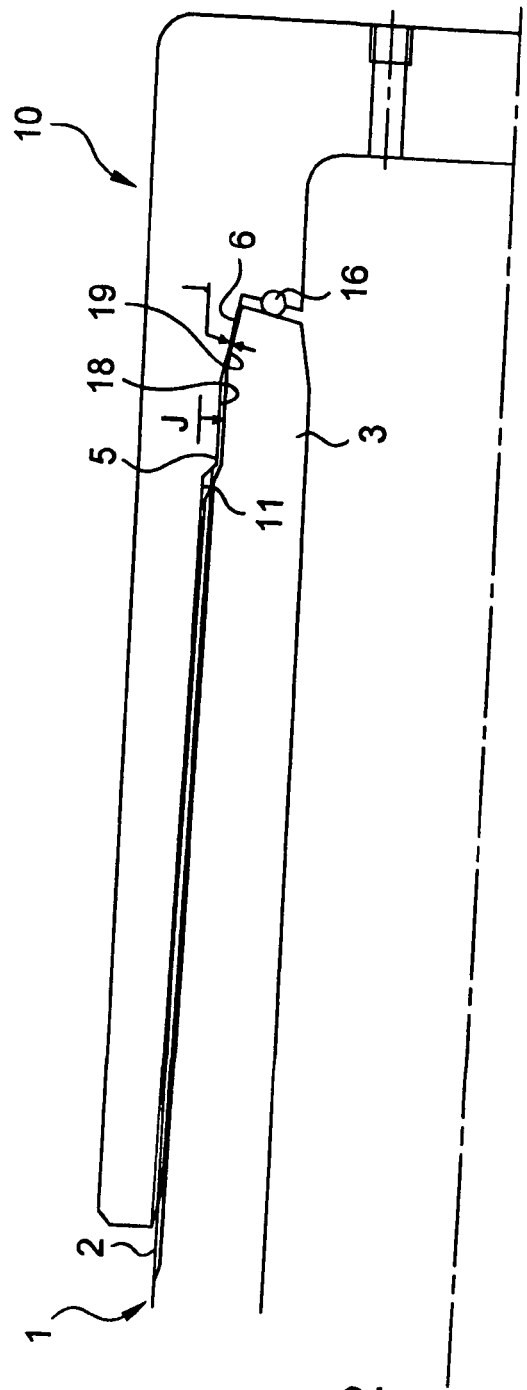

FIG. 2 shows the cap 10 and the male element 1 in the made up position.

In this position, the sealing ring 16 is axially compressed, for example by 20%, between the abutment surface 7 and the bottom of the groove 17 so as to guarantee a seal of the assembly of the cap and the component to be tested.

Further, the surface portions 18 and 19 of the cap can face the surface portions 5 and 6 of the component to be tested respectively, parallel thereto, with a diametrical clearance j of 0.3 mm subsisting between the tapered portions 6 and 19 and a larger diametrical clearance J, for example of 0.8 mm, between the cylindrical portions 5 and 18.

Figure 3:
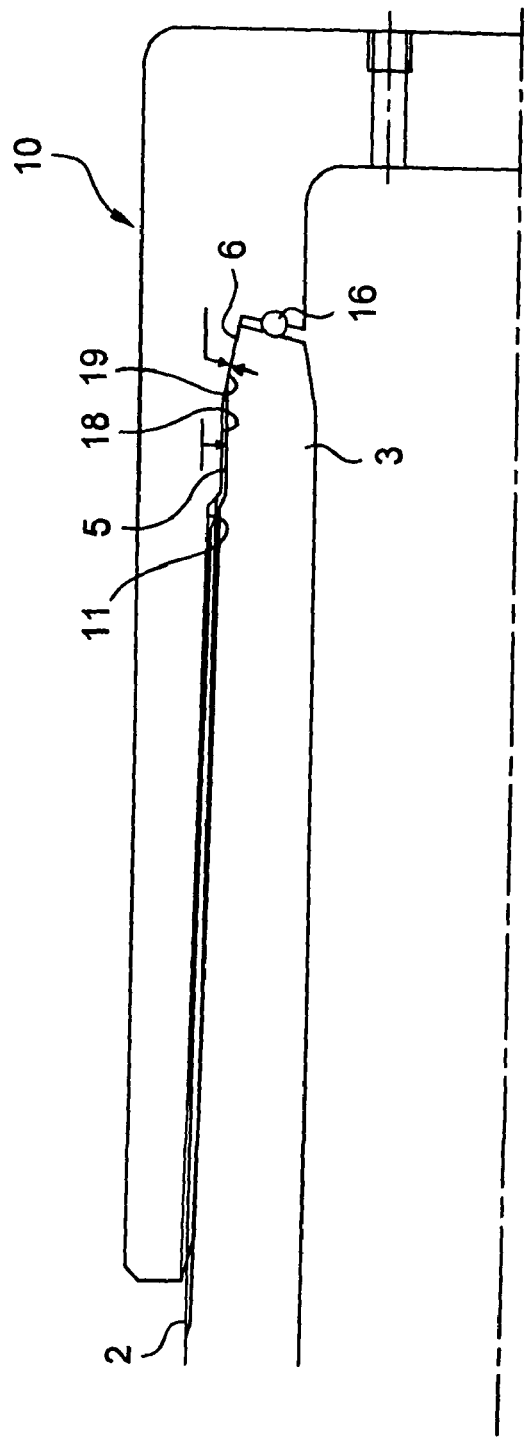

FIG. 3 shows the assembly of FIG. 2 undergoing a specified internal test pressure which may, for example, reach several hundred bars. Under this pressure, the lip 3 is slightly radially outwardly deformed (bell deformation) but its deformation is limited by contact between the sealing surface 6 of the lip and the facing peripheral surface 19 of the cap. The clearance j before pressurization is provided so that contact is obtained for a lip deformation which remains in the elastic deformation region. At the end of the test, the lip and more particularly the sealing surface return to their original positions, without permanent deformation. Permanent deformation of the sealing surface would not allow said surface to function correctly subsequently in the well and would thus run the risk of the tubular string leaking in service.

The diametrical clearance before pressurization between the sealing surface 6 and the facing peripheral surface of the cap is advantageously in the range 0.05 mm to 0.3% of the nominal diameter of the threadings 2 and 11. The minimum value for this clearance is selected to allow free engagement of the lip 3 in the cap housing, without contact and as a result without damaging the sealing surface. The maximum value for the initial diametrical clearance is selected so as to limit the deformation of the lip during the test by avoiding plastic deformation.

These values may be modified as a function of the particular characteristics of the component to be tested.

Thus, if it has a relative large diameter threaded element (nominal diameter of threading of more than 200 mm), the minimum value may be increased to 0.10 or even 0.20 mm.

Regarding the maximum value, it may be obtained by the following calculation. If $\Delta D$ represents the variation in diameter D of a hollow cylinder subjected to internal pressure at a stress equal to the conventional value of the yield stress, the value of the diametrical deformation $\Delta D/D$ is substantially equal to 0.5% for a conventional yield stress of the order of 600 MPa, 0.6% for a yield stress of the order of 800 MPa and 0.4% for a yield stress of the order of 400 MPa.

By selecting a maximum diametrical clearance of 0.3% of the nominal threading diameter, this clearance is guaranteed to be taken up by diametrical expansion during the test without the lip being substantially plasticized.

Since the clearance between the tapered surfaces depends on the relative axial positioning of the components, this latter must be adjusted, for example by matching up marks provided on the components, such as API triangle or T type marks. A further effective means is the use of an axial abutment as described below with reference to FIG. 5.

In a variation (not shown), contact between the female cap to be tested and the male end during the pressure test may be obtained between the outer cylindrical surface of the lip and the facing surface of the cap to be tested, the clearance before pressurization being greater between the tapered sealing surface of the lip and the facing surface of the cap.

Figure 4:
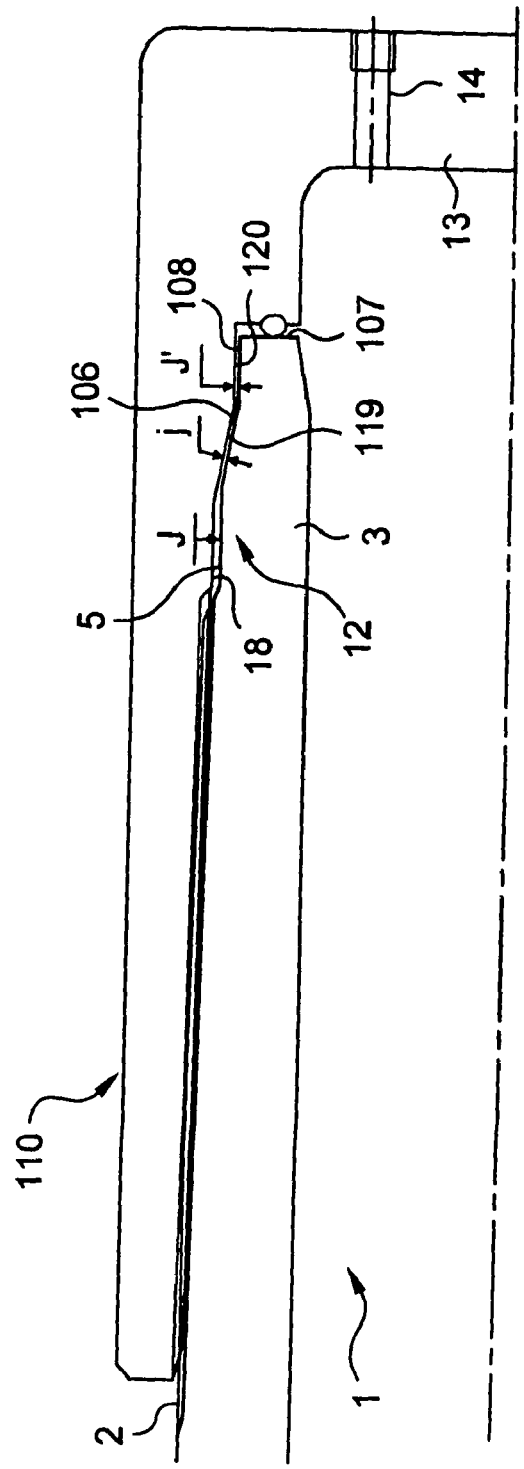

FIG. 4 illustrates a variation in which the surface of the end abutment 107 of the male tubular threaded element 1 of the component to be tested is perpendicular to the axis and in which the tapered sealing surface 106 is located at an axial distance from the abutment surface 107 and connected thereto and to the threading 2 via cylindrical surfaces 108 and 5 respectively.

The housing 12 of the female cap 110 to be tested has a tapered surface 119 and cylindrical surfaces 120 and 18 which face the surfaces 106, 108 and 5 respectively in the made up position.

In this embodiment, the clearance j between the surfaces 106 and 119 is selected so that said surfaces bear on each other by elastic deformation of the lip under the effect of the test pressure, the clearance J between the surfaces 5 and 18 and the clearance J' between the surfaces 108 and 120 being greater.

FIG. 5 shows a male tubular threaded element 1 which is identical to that of FIGS. 1 to 3 associated with a modified female cap 210.

The annular sealing ring 216 is limited by two outer 221 and inner 222 cylindrical peripheral surfaces, a flat surface 223 turned axially opposite to the lip 3 and a surface turned axially towards the lip 3, said latter surface having a hollow V shaped profile the respective flanks 224 and 225 of which receive the sealing surface 6 and the abutment surface 7 of the lip. The surfaces 221, 222 and 223 bear on the walls of a groove 217 with cylindrical flanks and a flat base cut in the housing 12 of the cap 10. The surface with a V shaped profile of the sealing ring 216 guarantees that it is not ejected when being compressed during makeup or extruded during the pressure test.

The residual surface 215 of the cap shoulder, radially inwardly with respect to the groove 217, has a taper corresponding to that of the abutment surface 7 with which it comes into contact to limit makeup of the cap. This can ensure reproducible makeup, regardless of the makeup conditions (operator, tools, etc) and thereby ensure reproducible compression of the deformable sealing ring.

Operation of the support for the lip 3 during the pressure test is ensured by the cylindrical peripheral surface 218 of the housing 12 which extends from the threading 11 to the bottom of the groove 217 and forms the radially outward flank thereof. A clearance j as indicated above is provided to this effect between the cylindrical surface 5 of the lip 3 and the surface 218.

Figure 6:
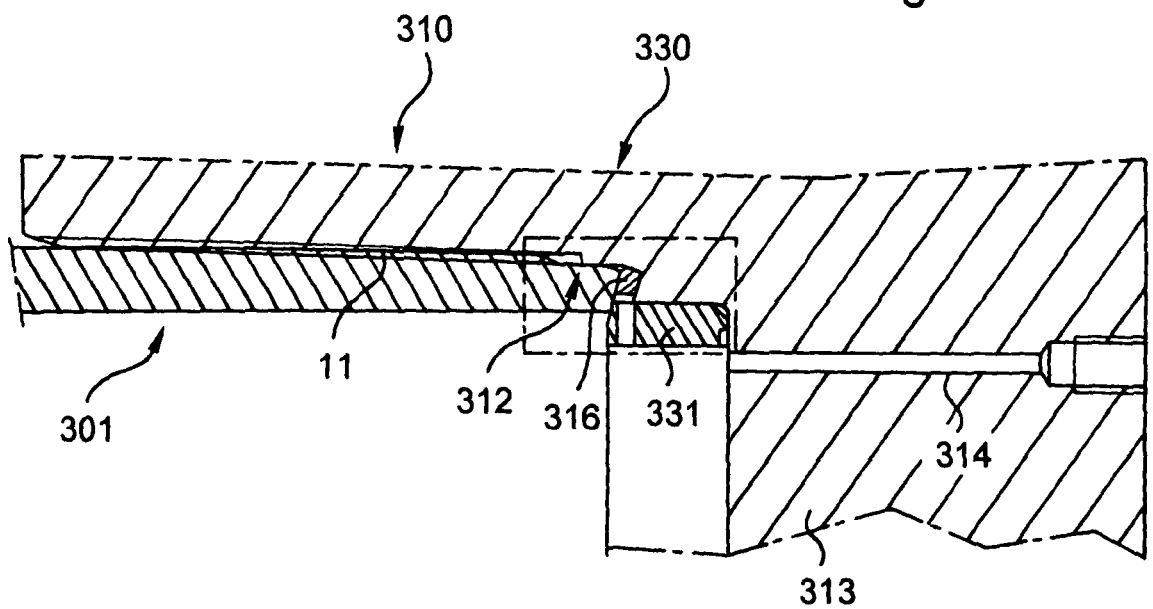
FIG. 6 is a partial axial half sectional view showing another implementation of the method.
Figure 6A:
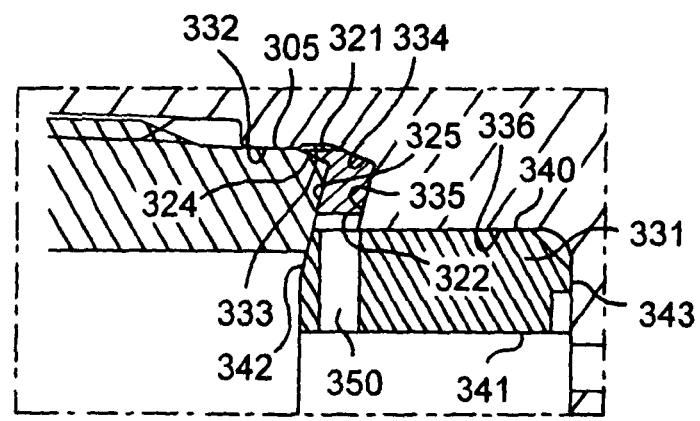
FIG. 6a is a detail of FIG. 6.

FIGS. 6 and 6a show a male tubular threaded element 301 identical to that of FIGS. 1 to 3 with the exception that the cylindrical surface 5 is replaced by a tapered surface 305 with a small taper, for example equal to that of the threading, i.e. 6.25% by diameter. In a variation, the surface 305 may comprise a tapered portion of said taper.

The male element 301 is associated with a modified female cap 310 which is composed of three portions: a metallic cap body 330, a deformable sealing ring 316 and a metal abutment sleeve 331.

The same as with the caps in the above embodiments, the body 330 is provided, with a female threading 11, a housing 312 for the lip 3 of the component to be tested and a blocking base 313 traversed by a pressurized fluid inlet 314.

The housing 312 of the cap body comprises, moving from the threading to the base of the cap, a first portion with a tapered peripheral surface 332 with the same taper as the surface 305 of the lip, defined by the top of an annular boss, a second portion with a cylindrical peripheral surface 333 which is slightly set back with respect to the first portion 332, two tapered surfaces 334 and 335 the tapers of which typically correspond to those of the sealing and abutment surfaces 6 and 7 of the component to be tested (for example respectively with a peak half angle of 20° and 75°) and a third portion with a cylindrical peripheral surface 336 adjacent to the base 313.

The deformable sealing ring, for example formed from polyurethane, is limited, like the sealing ring 216 of FIG. 5, by two outer peripheral 321 and inner cylindrical 322 surfaces and by a surface turned axially towards the lip 3, said latter surface having a hollow V profile the flanks 324 and 325 of which respectively receive the sealing surface 6 and the abutment surface 7 of the lip 3. In contrast to the sealing ring 216, the surface turned axially away from the lip 3 has a convex V shaped profile corresponding to the hollow or concave V shaped profile defined by the tapered surfaces 334 and 335 of the body 330.

The removable abutment sleeve 331 is limited by an outer cylindrical peripheral surface 340, an inner cylindrical peripheral surface 334, a first lateral surface directed towards the lip 3, comprising a tapered portion 342 with the same taper as the abutment surface 7, and a second lateral surface 343 directed towards the base 313 of the body.

The outer peripheral surface 340 cooperates with the surface portion 336 with a slight interference fit.

For the pressure test, the sleeve 331 is positioned abutting against the base of the body as shown in the figure. When the cap is made up onto the tubular component, the sleeve 331 is in axial abutment on one side against the base of the body 330 and on the other side against the radially inward portion of the abutment surface 7 of the component to be tested.

The use of the removable makeup abutment sleeve ensures reproducible makeup and thus a constant compression, for example 20%, of the sealing ring 316. This compression may be modified using a removable makeup abutment sleeve with a different length, thus ensuring flexible use of the cap to be tested.

Further, preliminary makeup without a sealing ring but in the presence of the removable makeup abutment sleeve allows the axial position at the end of makeup to be marked by a first mark on the outside of the component to be tested and a second mark in the extension of the former on the outside of the cap. These marks are of the type allowing both axial and circumferential positioning, for example, in known manner as an API triangle or T type mark. During final assembly, the operator can thus ensure that the abutment position is attained and as a result, the desired compression of the sealing ring is achieved by coincidence of the two marks.

The external diameter of the sleeve 331 is selected to be sufficiently larger than the diameter of the inner peripheral surface of the sealing ring 316 so that radial deformation inwardly of the sealing ring 316 resulting from its axial compression is free and not hindered by the outer peripheral surface of the sleeve.

A clearance j selected as indicated above is provided between the slightly tapered surface 305 of the lip 3 and the cylindrical part of the peripheral surface 332 of the cap.

The set back cylindrical part of the peripheral surface 333 located beyond the boss faces the outer peripheral surface 321 of the sealing ring 316 and at a distance therefrom to allow free radial deformation of the sealing ring at the end of makeup.

Through-holes machined between the peripheral surfaces of the abutment sleeve 331 can avoid any pressure differences between the interior of the component to be tested and the space located between said makeup sleeve and the sealing ring.

In FIG. 7, the female element 401 of a component undergoing a pressure test, which is not represented in its entirety, is provided with a female threading 402 and a non threaded tubular portion located beyond the threading with respect to the free end 404 of the threaded element, defining a housing 403. Said non threaded portion comprises a tapered sealing surface 406 adjacent to a tapered abutment surface 407, said threading and said two tapered surfaces being provided, for example, to cooperate respectively with the threading 2 and the surfaces 6 and 7 of a male element 1 identical to that in FIGS. 1 to 3 belonging to a tube in a tubular string.

The male plug 410 comprises a metal body 430, formed by a base wall 413 and a peripheral wall provided with a tapered male threading 411 matching the female threading 402, and defining a lip 412 extending opposite to the base 413 to a free end formed by two tapered surfaces 419 and 425 analogous to surfaces 6 and 7 of element 1. The base 413 is traversed by a test pressure fluid inlet 414.

The plug 410 also comprises a deformable annular sealing ring 416 disposed on the free end of the plug and having the same shape as the sealing ring 316 so as to cooperate via convex and concave V shaped profiles with surfaces 419 and 415 on the one hand and with surfaces 406 and 407 on the other hand, and a removable metal makeup abutment sleeve 431 partially housed in a recess in the body adjacent to the end surface 415 and to the radially inward surface of the lip.

The lip 412 has, between the threading 411 and the tapered surface 419, an annular boss the top 432 of which is a tapered surface with the same taper as the female threading 402, which at the end of makeup is located facing the end zone proximal thereto with a suitable clearance j, coming to bear against the threading during the pressure test, thereby preventing permanent deformation of the plug which would prevent its re-use.

Such a disposition allows the plug to be machined with a relatively thin lip and, as a result, allows its mass to be reduced, which may exceed 200 kg for threadings with a nominal diameter of 339.73 mm (13⅜") or more.

In the present text, the term "cylindrical" applied to surfaces should be construed as extending to tapered surfaces with a slight taper. Similarly, while only rectilinear sealing surfaces or rectilinear abutment profiles have been described, the invention is also applicable to components having sealing surfaces or profile abutments which are partially or completely curvilinear.

The invention claimed is:

1. A method for pressure testing a first component provided with a first threaded tubular element which includes a first threading and a sealing surface which, in service, can cooperate respectively with a matching threading and a sealing surface of another tubular threaded element for connection by makeup of two threaded elements with a metal-on-metal seal between said sealing surfaces, said method comprising:
    making up a second component onto the first threaded element to axially compress an annular sealing ring between substantially transverse metal surfaces of the first threaded element and the second component, the second component being a cap or a plug which includes a threading matching the first threading; and
    establishing a test pressure inside said first and second components,
    wherein one of said first and second components has a male threading, and the other of said first and second components has a female threading, said one of said first and second components which has said male threading includes, between the male threading and a free end of said one of said first and second components, an annular lip which is capable of deforming radially outwardly under the effect of said test pressure, and
    wherein between a radially outward surface of the annular lip and a facing surface of the other of said first and second components, at the end of makeup there exists a clearance having, over at least part of an entire length of the annular lip, a value which is selected so as to be sufficiently small so that, under the effect of the test pressure, the annular lip bears on said facing surface practically without undergoing plastic deformation.

2. A method according to claim 1, wherein said value is at least 0.05 mm in diametrical clearance.

3. A method according to claim 2, wherein a nominal diameter of said threadings of said first and second components is over 200 mm and said value is at least 0.1 mm in diametrical clearance.

4. A method according to claim 1, wherein said value represents a diametrical clearance of at most 0.3% of a nominal diameter of said threadings of said first and second components.

5. A method according to claim 1, wherein said radially outward surface of the annular lip comprises a generally tapered portion, said clearance having said value facing said generally tapered portion and a higher value facing a remainder of said radially outward surface of the annular lip.

6. A method according to claim 5, wherein said generally tapered portion is adjacent to the free end of the annular lip.

7. A method according to claim 5, wherein said generally tapered portion is distant from the free end of the annular lip and separated therefrom by a portion which is less inclined to the axis than said generally tapered portion.

8. A method according to claim 1, wherein said radially outward surface comprises a generally tapered portion and at least one portion which is less inclined to the axis than said generally tapered portion, said clearance having said value facing at least said less inclined portion and a higher value facing a remainder of said radially outward surface.

9. A method according to claim 5, wherein said one of said first and second components which has the male threading is the first component and said tapered portion constitutes said sealing surface.

10. A method according to claim 1, wherein said one of said first and second components which has the male threading is the first component and said clearance has said value between a cylindrical portion of said radially outward surface and a cylindrical boss formed on said facing surface.

11. A method according to claim 1, wherein said sealing ring is partially housed in an annular groove of the second component.

12. A method according to claim 1, wherein the free end of the annular lip has a convex V shaped profile which can engage with a concave V shaped profile of said sealing ring.

13. A method according to claim 12, wherein said sealing surface of said first threaded element is tapered and defines one of the branches of said convex V shaped profile.

14. A method according to claim 1, wherein the second component has an axial abutment surface which abuts with a corresponding surface of the first component to limit compression of the sealing ring.

15. A method according to claim 1, wherein the second component comprises a cap body on which an insert is mounted which is removable or axially adjustable, having said axial abutment surface.

16. A method according to claim 1, wherein said threadings of the first and second components are non interfering, so as to allow makeup using manual equipment.

17. A female cap for carrying out the method according to claim 1, comprising:
    a metal body formed by a cap base and a peripheral wall; and
    the annular sealing ring, said peripheral wall having a female threading which is capable of cooperating with a male threading of a first tubular threading element of the first component to be tested under pressure, for a thread connection of said two threading elements, said peripheral wall further defining axially between said female threading and said base, a housing for receiving the annular male lip of said first threaded element, said annular male lip being subject to radial deformation outwards under said test pressure, wherein there exists at the end of the treading operation, between a radially external surface of said annular lip and the facing surface of said cap, the clearance having, along at least a portion of the length of said annular lip, the measure being selected so as to be sufficiently small so that, under the effect of the test pressure, the annular lip bears on said facing surface practically without undergoing plastic deformation.

18. A male plug for carrying out the method according to claim 1, comprising:

a metal body formed by a plug body and a peripheral wall; and the annular sealing ring, said peripheral wall having a male threading which can cooperate with the female threading of a first tubular threaded element of a first component to be tested under pressure, for a thread connection of said two threading elements, said peripheral wall extending axially between said male threading and said base, and defining a male lip capable of being received in a housing of said first threaded element, wherein there exists at the end of the treading operation, between the radially external surface of said lip and the facing surface of said first tubular threaded element, the clearance having, along at least a portion of the length of said lip, the measure being selected so as to be sufficiently small so that, under the effect of the test pressure, the lip bears on said facing surface of said first tubular threaded element practically without undergoing plastic deformation.

* * * * *